3,141,900
NOVEL UNSATURATED ISOCYANATES AND
PROCESS FOR PREPARATION
John W. Lynn, Charleston, and Thomas K. Brotherton, South Charleston, W. Va., assignors to Union Carbide Corporation, a corporation of New York
No Drawing. Filed Feb. 10, 1961, Ser. No. 88,279
17 Claims. (Cl. 260—453)

This invention relates, in general, to a new class of unsaturated isocyanates. In one aspect, this invention relates to novel unsaturated isocyanates of bicycloalkenes and to a process for their preparation.

The novel compounds of this invention can be conveniently represented by the following general formula:

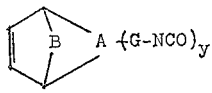

wherein B represents a divalent radical which is a member selected from the group consisting of methylene and ethylene groups; A represents a polyvalent radical which is a member selected from the group consisting of:

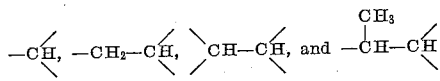

groups; G represents a divalent radical containing from 1 to 10 carbon atoms and which is a member selected from the group consisting of alkylene, alkenylene, alkynylene, arylene, arylenealkylene, alkarylene, arylenealkenylene, alkenylenearylene, arylenealkynylene, alkynylenearylene, cycloalkylene, cycloalkenylene, alkylcycloalkylene, alkylcycloalkenylene, cycloalkylenealkylene, heterocyclylene, heterocyclylenealkylene, alkyleneheterocyclylene, alkynyleneheterocyclylene, aryleneheterocyclylene, and heterocyclylenearylene groups; and y is a whole positive integer of from 1 to 2.

Illustrative compounds encompassed by the present invention include, among others, 2-(isocyanatomethyl)bicyclo[2.2.1]-5-heptene, 2,3-bis(isocyanatomethyl)bicyclo[2.2.1]-5-heptene, 2-(4-isocyanatocyclohexyl)bicyclo[2.2.1]-5-heptene, 2,3-bis(4-isocyanatocyclohexyl)bicyclo[2.2.1]-5-heptene, 2-(4-isocyanatophenyl)bicyclo[2.2.1]-5-heptene, 2,3 - bis(4-isocyanatophenyl)bicyclo[2.2.-]-5-heptene, and the like.

Isocyanates are very reactive materials which readily condense with active hydrogen-containing compounds such as alcohols, amines, carboxylic acids, amides, and water to form carbamates, ureas and the like. Additionally, isocyanates can be homopolymerized to yield dimeric, trimeric and polymeric substances, or copolymerized to form valuable polymeric materials. Isocyanate-containing copolymers have been found particularly useful in the preparation of urethane foams, fibers, films, coatings, elastomers, and castings. For example, the polyisocyanates have been found useful in the preparation of flexible high molecular weight polymers by combining the polyisocyanate with flexible resins such as polyether glycols. Inasmuch as the novel compositions of one embodiment of this invention, wherein y has a value of 2, are difunctional, in that each compound contains two isocyanate groups within the same molecule, they are particularly useful in those fields of application wherein polyisocyanates have been utilized.

It is, therefore, an object of the present invention to provide novel unsaturated isocyanates which are suitable for use in the plastic and resin fields. Another object is to provide new compositions of matter comprising unsaturated isocyanates. A further object of the present invention is to provide new compositions of matter comprising the 2-(isocyanatoalkyl)bicyclo[2.2.1]-5-heptenes, the 2-(isocyanatoaryl)bicyclo[2.2.1]-5-heptenes, and related compounds. Another object of this invention is to provide novel compounds containing two isocyanate groups. A still further object of the present invention is to provide novel compositions having polyfunctional properties. Another object of the present invention is to provide a novel process for the preparation of the aforesaid compositions. These and other objects will readily become apparent to those skilled in the art in the light of the teachings herein set forth.

In its broad aspect, this invention is directed to novel unsaturated isocyanates of the aforementioned general formula and to a process for their preparation. The novel compositions of the instant invention can be either monofunctional or difunctional depending upon the number of isocyanate groups attached to the bicyclic ring. Thus, when y of the above formula has a value of 2, the molecule will be a diisocyanate. In either case, each composition will be an unsaturated isocyanate.

In one embodiment of the present invention the novel unsaturated isocyanates are represented by the aforementioned formula wherein only one isocyanate group is present in the molecule. Preferred compounds within this embodiment include those wherein y of the above general formula has a value of 1 and A, B and G are as previously defined. Particularly preferred compounds within this embodiment are those represented by the class formula:

wherein G has the same value as hereinbefore indicated. The following compounds illustrate the novel unsaturated isocyanates of this embodiment of the present invention:

2-(isocyanatomethyl)bicyclo[2.2.1]-5-heptene,
2-(4-isocyanatobutyl)bicyclo[2.2.1]-5-heptene,
2-(9-isocyanatononyl)bicyclo[2.2.1]-5-heptene,
2-(9-isocyanato-4-nonenyl)bicyclo[2.2.1]-5-heptene,
2-(4-isocyanatophenyl)bicyclo[2.2.1]-5-heptene,
2-(4-isocyanatophenylmethyl)bicyclo[2.2.1]-5-heptene,
2-(4-isocyanatomethylphenyl)bicyclo[2.2.1]-5-heptene,
2-(2-isocyanatonaphthyl)bicyclo[2.2.1]-5-heptene,
2-(3-isocyanato-4-tolyl)bicyclo[2.2.1]-5-heptene,
2[4(4'-isocyanatophenyl)-2-butenyl]bicyclo[2.2.1]-5-heptene,
2[4(4'-isocyanato-2'-butenyl)phenyl]bicyclo[2.2.1]-5-heptene,
2-(3-isocyanatocyclohexyl)bicyclo[2.2.1]-5-heptene,
2-(4-isocyanato-2-cyclohexenyl)bicyclo[2.2.1]-5-heptene,
2-(3-isocyanatocyclohexylmethyl)bicyclo[2.2.1]-5-heptene,
2-(4-isocyanato-2-cyclohexenylmethyl)bicyclo[2.2.1]-5-heptene,
2-(4-isocyanatomethylcyclohexyl)bicyclo[2.2.1]-5-heptene,
2[4(2'-isocyanatoethyl)cycloheptyl]bicyclo[2.2.1]-5-heptene,
2[4(4'-isocyanatobutyl)-2-cyclohexenyl]bicyclo[2.2.1]-5-heptene,
2-(2-isocyanatoethylpiperidyl)bicyclo[2.2.1]-5-heptene,
2-(3-isocyanatofurfuryl)bicyclo[2.2.1]-5-heptene, and the like.

In a second embodiment of the present invention the novel unsaturated isocyanates are represented by the aforesaid general formula wherein two isocyanate groups are present in the molecule. Preferred compounds within this embodiment include those wherein y of the above general formula has a value of 2 and A, B and G have the same values as hereinbefore defined. Particularly preferred compounds within this embodiment are those represented by the class formula:

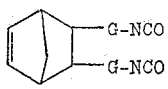

wherein G is as previously indicated and need not represent the same groups in the molecule. The following compounds illustrate the novel unsaturated diisocyanates of this embodiment of the present invention:

2,3-bis(isocyanatomethyl)bicyclo[2.2.1]-5-heptene,
2,3-bis(9-isocyanatononyl)bicyclo[2.2.1]-5-heptene,
2,3-bis(9-isocyanato-4-nonenyl)bicyclo[2.2.1]-5-heptene,
2,3-bis(4-isocyanatophenyl)bicyclo[2.2.1]-5-heptene,
2,3-bis(4-isocyanatophenylmethyl)bicyclo[2.2.1]-5-heptene,
2,3-bis(4-isocyanatomethylphenyl)bicyclo[2.2.1]-5-heptene,
2,3-bis(2-isocyanatonaphthyl)bicyclo[2.2.1]-5-heptene,
2,3-bis(2-isocyanato-4-tolyl)bicyclo[2.2.1]-5-heptene,
2,3-bis(3-isocyanatocyclohexyl)bicyclo[2.2.1]-5-heptene,
2,3-bis(4-isocyanato-2-cyclohexenyl)bicyclo[2.2.1]-5-heptene,
2,3-bis(3-isocyanatocyclohexylmethyl)bicyclo[2.2.1]-5-heptene,
2,3-bis(4-isocyanato-2-cyclohexenylmethyl)bicyclo-[2.2.1]-5-heptene,
2,3-bis(4-isocyanatomethylcyclohexyl)bicyclo[2.2.1]-5-heptene,
2,3-bis[4(2′-isocyanatoethyl)cycloheptyl]bicyclo[2.2.1]-5-heptene,
2,3-bis[4(4′-isocyanatobutyl)-2-cyclohexenyl]bicyclo-[2.2.1]-5-heptene,
2,3-bis(2-isocyanatoethylpiperidyl)bicyclo[2.2.1]-5-heptene,
2,3-bis(3-isocyanatofurfuryl)bicyclo[2.2.1]-5-heptene, and the like.

Although the preferred unsaturated isocyanates of this invention contain no elements other than carbon, hydrogen, oxygen and nitrogen, the various component groups of the molecule can be substituted with various organic and inorganic radicals containing such groups as ether, sulfide, polysulfide, sulfone, sulfoxide, ester, nitro, nitrile, carbonate, and various metal groups.

In accordance with the process of the instant invention, the novel unsaturated isocyanates of the aforementioned embodiments can be produced in relatively high yields by sparging a carbonyl dihalide through a slurry of the amine or amine hydrohalide starting material contained in an inert, normally liquid reaction medium at a temperature within the range of from about 25° to about 200° C., more preferably from about 75° C., to about 150° C., and thereafter recovering the isocyanate product.

In general, the liquid reaction medium employed in the conversion of the unsaturated amines to the corresponding novel isocyanates must be inert to the reactants and stable under the conditions employed. Moreover, it should be easily separable from the resulting isocyanate. Typical inert, liquid solvents which have been found suitable for utilization as media in the process of the present invention include, among others, aromatic hydrocarbons such as toluene, xylene, naphthalene, tetrahydronaphthalene, benzene, diphenyl, cymene, amylbenzene, cycloaliphatic hydrocarbons such as cyclohexane, dihydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methylisobutyl ketone, methylhexyl ketone, diisopropyl ketone and other solvents such as nitrobenzene, tetramethylene sulfone, and the like.

Although reaction temperatures within the aforementioned range of from about 25° to about 200° C., and more preferably from about 75° to about 150° C. have been found desirable, temperatures above and below this range can also be employed. However, from economic considerations the optimum yield and rate of reaction are attained within the aforesaid ranges.

Pressure is in no wise critical and the instant process can be conducted at atmospheric, subatmospheric and superatmospheric pressures.

Although the process of the instant invention preferably is conducted with phosgene, in its broadest concept the process includes the utilization of any carbonyl dihalide such as carbonyl difluoride, or carbonyl dibromide. However, for economic considerations phosgene is the preferred carbonyl dihalide. In the preparation of the novel isocyanates of this invention, phosgene can be used in either the gaseous or liquid form.

Inasmuch as the yield and rate of formation of the isocyanates are dependent upon several variables, for example, concentration of the amine, solubility of the amine and phosgene in the reaction medium, reaction temperature, pressure and rate of addition of the phosgene, no hard and fast rule can be devised regarding the optimum conditions to be employed.

In a preferred embodiment of the present process a toluene solution containing the amine was gradually added to a solution of phosgene in toluene over a period of approximately 30 minutes. Thereafter phosgene is subsequently sparged through the reaction mixture for about 5 hours while the temperature is raised to about 100° C. After removal of the by-product hydrogen chloride and the solvent a crude isocyanate product is obtained which can be refined by known purification techniques such as distillation, recrystallization and the like.

In practice, it has been found that the mole ratio of phosgene to amine in the initial reaction medium preferably should be in excess of 3:1, although satisfactory results have been obtained at a lower ratio. When the phosgene subsequently is sparged into the reaction medium feed rates of up to about 10 moles of phosgene per mole of amine per hour are preferred.

The starting materials for the production of the novel compounds of the present invention as hereinabove indicated, are the corresponding unsaturated amines. These compounds can be conveniently represented by the following general formula:

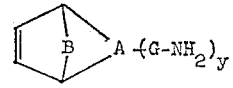

wherein A, B and G have the same value as previously indicated. Thus, for the preparation of the novel isocyanates encompassed by the first embodiment of the present invention the amine starting materials can be represented by the class formula:

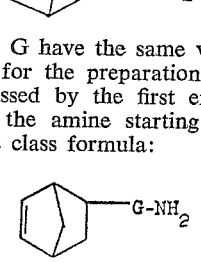

wherein G has the same value as previously indicated. Similarly, the amine starting materials for the isocyanates of the aforesaid second embodiment can be represented by the class formula:

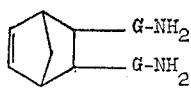

wherein G has the same value as indicated above. Each of the aforementioned classes of unsaturated amines is derived by a Diels-Alder reaction employing cyclopentadiene and an appropriate unsaturated amine. Illustrative unsaturated amines which can be condensed with cyclopentadiene and the resulting amine starting material are as follows:

allylamine,
2-butene-1,4-diamine,
5-hexenylamine,
5-decene-1,10-diamine,
10-undecenylamine,
10-eicosene-1,20-diamine,
4-aminostyrene,
1,2-bis(4-aminophenyl)ethylene,
3(4-aminophenyl)-1-propylene,
1,4-bis(4-aminophenyl)-2-butene,
4-aminomethylstyrene,
1,4-bis(4-aminomethylphenyl)-2-butene,
3-methyl-5-aminostyrene,
1,2-bis(3-methyl-5-aminophenyl)ethylene,
3-vinylcyclohexylamine,
1,2-bis(3-aminocyclohexyl)ethylene, and the like.

Upon condensation with cyclopentadiene the following amine starting materials are obtained from the aforementioned unsaturated amines:

2-(aminomethyl)bicyclo[2.2.1]-5-heptene,
2,3-bis(aminomethyl)bicyclo[2.2.1]-5-heptene,
2-(4-aminobutyl)bicyclo[2.2.1]-5-heptene,
2,3-bis(4-aminobutyl)bicyclo[2.2.1]-5-heptene,
2-(9-aminononyl)bicyclo-[2.2.1]-5-heptene,
2,3-bis(9-aminononoyl)bicyclo[2.2.1]-5-heptene,
2-(4-aminophenyl)bicyclo[2.2.1]-5-heptene,
2,3-bis(aminophenyl)bicyclo[2.2.1]-5-heptene,
2-(4-aminophenylmethyl)bicyclo[2.2.1]-5-heptene,
2,3-bis(4-aminophenylmethyl)-bicyclo[2.2.1]-5-heptene,
2-(4-aminomethylphenyl)bicyclo[2.2.1]-5-heptene,
2,3-bis(4-aminomethylbenzyl)bicyclo[2.2.1]-5-heptene,
2-(3-methyl-5-aminophenyl)bicyclo[2.2.1]-5-heptene,
2,3-bis(3-methyl-5-aminophenyl)bicyclo[2.2.1]-5-heptene,
2-(3-aminocyclohexyl)bicyclo[2.2.1]-5-heptene,
2,3-bis(3-aminocyclohexyl)bicyclo[2.2.1]-5-heptene, and the like.

When subjected to the process of the instant invention the aforementioned unsaturated amine starting materials will give the following corresponding isocyanates:

2-(isocyanatomethyl)bicyclo[2.2.1]-5-heptene,
2,3-bis(isocyanatomethyl)bicyclo[2.2.1]-5-heptene,
2-(4-isocyanatobutyl)bicyclo[2.2.1]-5-heptene,
2,3-bis(4-isocyanatobutyl)bicyclo[2.2.1]-5-heptene,
2-(9-isocyanatononyl)-bicyclo[2.2.1]-5-heptene,
2,3-bis(9-isocyanatononyl)-bicyclo[2.2.1]-5-heptene,
2-(4-isocyanatophenyl)bicyclo[2.2.1]-5-heptene,
2,3-bis(isocyanatophenyl)bicyclo[2.2.1]-5-heptene,
2-(4-isocyanatophenylmethyl)bicyclo[2.2.1]-5-heptene,
2,3-bis(4-isocyanatophenylmethyl)bicyclo[2.2.1]-5-heptene,
2-(4-isocyanatomethylphenyl)bicyclo[2.2.1]-5-heptene,
2,3-bis(4-isocyanatomethylbenzyl)bicyclo[2.2.1]-5-heptene,
2-(3-methyl-5-isocyanatophenyl)bicyclo[2.2.1]-5-heptene,
2,3-bis(3-methyl-5-isocyanatophenyl)bicyclo[2.2.1]-5-heptene,
2-(3-isocyanatocyclohexyl)bicyclo[2.2.1]-5-heptene,
2,3-bis(3-isocyanatocyclohexyl)bicyclo[2.2.1]-5-heptene, and the like.

Although the amine starting materials are prepared preferably from cyclopentadiene and an unsaturated amine, other synthetic routes can also be used. For instance, cyclopentadiene can be condensed with an unsaturated halide by a Diels-Alder reaction followed by amminolysis with ammonia to give the corresponding amine. Similarly, cyclopentadiene can be condensed with an unsaturated nitro compound and subsequently reduced to the amine.

The following example is illustrative:

EXAMPLE I 2-(Isocyanatomethyl)Bicyclo[2.2.1]-5-Heptene

A solution of 2-(aminomethyl)bicyclo[2.2.1]-5-heptene (95 percent purity, 390 grams, 3.0 moles) in 600 grams of toluene was added to a toluene (960 grams) solution of phosgene (1410 grams, 14.25 moles) over a period of 25 minutes. The reaction mixture warmed from −20 to −4° C. during the addition. Phosgene was subsequently sparged through the mixture for about 5 hours as the temperature of the mixture was gradually raised to 102° C. Dry nitrogen was then sparged through the solution to remove by-product hydrogen chloride and excess phosgene. After removing the solvent, 348 grams (77.3 percent yield) of crude product was obtained. Refined product was obtained in 68 percent yield on subsequent distillation of the crude product. The material had a boiling point of 81° C. at a pressure of 3.5 millimeters of mercury; a refractive index, $n\ 30/D$, 1.4837, and was a strong lachrymator (99.3 percent purity by isocyanate determination). Analysis for C, H, and N gave the following. Calculated for $C_9H_{11}NO$: C, 72.5; H, 7.38; N, 9.4. Found: C, 72.95; H, 7.69; N, 9.1.

Infrared spectrum was in agreement with that expected for the subject compound with maxima at $$3.3\mu\ (=\overset{|}{C}H),\ 4.4\mu\ (-NCO)$$
$$6.4\mu\ (C=C\ \text{strained ring}),\ 13.85\mu\ (\text{cis}\ RCH=CHR)$$

Although the invention has been illustrated by the preceding example, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. Unsaturated isocyanates represented by the following formula:

wherein B represents a divalent radical which is a member selected from the group consisting of methylene and ethylene groups; A represents a polyvalent radical which is a member selected from the group consisting of:

$$-C\overset{/}{\underset{\backslash}{H}},\ -CH_2-C\overset{/}{\underset{\backslash}{H}},\ \overset{/}{\underset{\backslash}{\phantom{C}}}CH-C\overset{/}{\underset{\backslash}{H}},\ \text{and}\ -\overset{CH_3}{\underset{|}{C}H}-C\overset{/}{\underset{\backslash}{H}}$$

groups; G represents a divalent hydrocarbyl radical containing from 1 to 10 carbon atoms, and y is a whole positive integer of from 1 to 2, with the proviso that when y is 2 not more than one G represents an alkylene group.

2. Unsaturated isocyanates represented by the following formula:

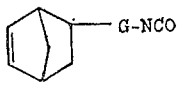

wherein G represents a divalent hydrocarbyl radical containing from 1 to 10 carbon atoms.

3. Unsaturated isocyanates represented by the following formula:

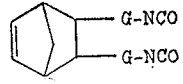

wherein G represents a divalent hydrocarbyl radical containing from 1 to 10 carbon atoms with the proviso that not more than one G represents an alkylene group.

4. A 2-(isocyanatoalkyl)bicyclo[2.2.1]-5-heptene wherein said alkyl contains from 1 to 10 carbon atoms.

5. A 2-(isocyanatoalkenyl)bicyclo[2.2.1]-5-heptene wherein said alkenyl contains from 3 to 10 carbon atoms.

6. A 2,3-bis(isocyanatoalkenyl)bicyclo[2.2.1]-5-heptene wherein each of said alkenyl contains from 3 to 10 carbon atoms.

7. A 2-(isocyanatoaryl)bicyclo[2.2.1]-5-heptene wherein said aryl contains from 6 to 10 carbon atoms.

8. A 2,3-bis(isocyanatoaryl)bicyclo[2.2.1]-5-heptene wherein each of said aryl contains from 6 to 10 carbon atoms.

9. A 2-(isocyanatoalkaryl)bicyclo[2.2.1]-5-heptene wherein said alkaryl contains from 7 to 10 carbon atoms.

10. A 2,3-bis(isocyanatoalkaryl)bicyclo[2.2.1]-5-heptene wherein each of said alkaryl contains from 7 to 10 carbon atoms.

11. A 2-(isocyanatocycloalkyl)bicyclo[2.2.1]-5-heptene wherein said cycloalkyl contains from 4 to 10 carbon atoms.

12. A 2,3-bis(isocyanatocycloalkyl)bicyclo[2.2.1]-5-heptene wherein each of said cycloalkyl contains from 4 to 10 carbon atoms.

13. A 2-(isocyanatoalkylcycloalkyl)bicyclo[2.2.1]-5-heptene wherein said alkylcycloalkyl contains from 5 to 10 carbon atoms.

14. A 2,3-bis(isocyanatoalkylcycloalkyl)bicyclo[2.2.1]-5-heptene wherein each of said alkylcycloalkyl contains from 5 to 10 carbon atoms.

15. A 2-(isocyanatocycloalkenyl)bicyclo[2.2.1]-5-heptene wherein said cycloalkenyl contains from 4 to 10 carbon atoms.

16. A 2,3-bis(isocyanatocycloalkenyl)bicyclo[2.2.1]-5-heptene wherein each of said cycloalkenyl contains from 4 to 10 carbon atoms.

17. 2-(isocyanatomethyl)bicyclo[2.2.1]-5-heptene.

References Cited in the file of this patent

UNITED STATES PATENTS

| | | |
|---|---|---|
| 2,683,160 | Irwin | July 6, 1954 |
| 2,942,026 | Boehme et al. | June 21, 1960 |

OTHER REFERENCES

Degering: "Outline of Organic Nitrogen Compounds," page 543 (1945).

Piepenbrink: "Annalen der Chemie" 572, 83–95 (1950) (pages 85, 86, 90, 91 relied on).

Parham et al.: J. Am. Chem. Soc. 73, 5068–70 (1951).